US010268231B2

(12) United States Patent
Nagaki et al.

(10) Patent No.: US 10,268,231 B2
(45) Date of Patent: Apr. 23, 2019

(54) LOCK STRUCTURE FOR OPERATING LEVER

(71) Applicant: NAGAKI SEIKI CO., LTD., Osaka (JP)

(72) Inventors: Takayuki Nagaki, Osaka (JP); Tamotsu Iwama, Osaka (JP)

(73) Assignee: NAGAKI SEIKI CO., LTD., Osaka (JP)

( * ) Notice: Subject to any disclaimer, the term of this patent is extended or adjusted under 35 U.S.C. 154(b) by 0 days.

(21) Appl. No.: 15/572,233

(22) PCT Filed: May 16, 2016

(86) PCT No.: PCT/JP2016/002390
§ 371 (c)(1),
(2) Date: Nov. 7, 2017

(87) PCT Pub. No.: WO2016/203704
PCT Pub. Date: Dec. 22, 2016

(65) Prior Publication Data
US 2018/0107234 A1    Apr. 19, 2018

(30) Foreign Application Priority Data

Jun. 15, 2015 (JP) ................................ 2015-119925

(51) Int. Cl.
*G05G 5/18* (2006.01)
*B25B 7/12* (2006.01)
(Continued)

(52) U.S. Cl.
CPC ................. *G05G 5/18* (2013.01); *B25B 7/08* (2013.01); *B25B 7/12* (2013.01); *B25B 7/14* (2013.01);
(Continued)

(58) Field of Classification Search
CPC ........ G05G 5/18; G05G 2505/00; H02G 1/02; B25B 7/08; B25B 7/12; B25B 7/14; B25B 7/16; B25J 1/04
(Continued)

(56) References Cited

U.S. PATENT DOCUMENTS

| 262,615 | A | * | 8/1882 | Proctor | .................. | B23G 1/261 |
| | | | | | | 408/120 |
| 948,946 | A | * | 2/1910 | Wittman | ................ | B25G 1/063 |
| | | | | | | 254/DIG. 3 |

(Continued)

FOREIGN PATENT DOCUMENTS

| JP | 5-86667 | 11/1993 |
| JP | 6-49849 | 7/1994 |

(Continued)

*Primary Examiner* — David H Bollinger
(74) *Attorney, Agent, or Firm* — Greenblum & Bernstein, P.L.C.

(57) ABSTRACT

A lock structure is constituted of a gear and an engagement/disengagement switching section. The gear is disposed concentric with a turning center of an operating lever. The engagement/disengagement switching section is provided with an engagement pawl such that the engagement pawl can move toward and away from the gear. The engagement pawl is connected to a switching lever to form a substantially T-like shape, and the switching lever is pivotally supported by a body section of the engagement/disengagement switching section. A locking operation of the switching lever switches between the locked state and unlocked state of the operating lever. In an engaged state, a gap having an opening angle of α in a direction in which the operating lever loosens is formed between a tooth groove of the gear and the engagement pawl.

3 Claims, 8 Drawing Sheets

(51) Int. Cl.
*H02G 1/02* (2006.01)
*B25B 7/14* (2006.01)
*B25J 1/04* (2006.01)
*B25B 7/08* (2006.01)

(52) U.S. Cl.
CPC .............. *B25J 1/04* (2013.01); *H02G 1/02* (2013.01); *G05G 2505/00* (2013.01)

(58) Field of Classification Search
USPC .......................... 74/527, 529, 532, 533, 535
See application file for complete search history.

(56) References Cited

U.S. PATENT DOCUMENTS

| | | | | | |
|---|---|---|---|---|---|
| 2,016,436 | A | * | 10/1935 | Jahnke | G05G 5/18 |
| | | | | | 74/535 |
| 5,005,438 | A | * | 4/1991 | Marshall | B62M 11/08 |
| | | | | | 74/473.13 |
| 5,365,804 | A | * | 11/1994 | Downs | B60T 1/005 |
| | | | | | 188/31 |
| 5,564,315 | A | * | 10/1996 | Schuler | B60N 2/0806 |
| | | | | | 248/424 |

FOREIGN PATENT DOCUMENTS

| | | |
|---|---|---|
| JP | 11-205929 | 7/1999 |
| JP | 11-346410 | 12/1999 |
| JP | 2007-127207 | 5/2007 |
| JP | 2014-75904 | 4/2014 |

* cited by examiner

LOCK STRUCTURE FOR OPERATING LEVER

FIELD

The present invention relates to a lock structure for an operating lever of long-reach pincers used for safely gripping an overhead line and other components from a distant position in overhead wiring, wherein a high voltage is applied to the overhead line and other components.

BACKGROUND

In overhead wiring, a long-reach tool is generally used in consideration of operator's safety. To grip an object, in particular, long-reach pincers with pincers attached thereto as a tip tool is used.

A gripping device such as pincers often encounters situations in which a gripping state needs to be maintained to retain a certain work state. In the case of the long-reach pincers, since the pincers are attached to a tip of a long-reach operating rod, even handling the long-reach pincers is highly burdensome for an operator. Therefore additional work of maintaining the gripping state further increases operator's fatigue. Moreover, the large burden on the operator causes problem of lower safety level and work efficiency.

In view of this, indirect live-line gripping tools (e.g., long-reach pincers) capable of being locked in a gripping state have been proposed in the conventional techniques. FIG. 6 shows an example of a conventional long-reach pincers 100.

In the long-reach pincers 100 shown in FIG. 6, pincers 102, a gripping device, are attached to a tip of a long-reach operating rod 101 including a main shaft 101a, formed of an insulating material, and an operating shaft 101b attached along the main shaft 101a in a substantially parallel manner. An operating lever 103 is pivotally supported (a turning center 103b) on the main shaft 101a in a hand side. The pincers 102 can be opened or closed through the operating shaft 101b connected to a point 103a of action at one end in the operating lever 103. A lock structure 104 capable of locking the pincers 102 in a state of gripping an object to be gripped is provided in a vicinity of the operating lever 103. An enlarged view of a structure around the operating lever 103 is shown in FIG. 7.

As shown in FIG. 7, the long-reach pincers 100 (see FIG. 6) includes the lock structure 104 around a position at which the operating lever 103 is pivotally supported. The lock structure 104 is provided with a unidirectional rotation mechanism 105 including a ratchet gear 105a integrally provided with the operating lever 103 and a ratchet pawl 105b arranged to be engageable with the ratchet gear 105a.

With such a configuration, when the ratchet pawl 105b is engaged with the ratchet gear 105a provided integrally with the operating lever 103 in a state of gripping an object to be gripped, the gripping state can be maintained even when an operator releases his/her hands from the operating lever 103. This can improve work efficiency in overhead wiring. The indirect live-line gripping tool such as the long-reach pincers 100 is disclosed in Patent Literature 1.

CITATION LIST

Patent Literature

Patent Literature 1: Japanese Patent Application Laid-Open No. Hei. 11-205929

SUMMARY

Technical Problem

A flexible insulating member such as an FRP material is often used in the long-reach operating rod 101 as mentioned above. In addition, to reduce work burden, the main shaft 101a and the operating shaft 101b each having the smallest possible diameter are tend to be employed.

In a configuration in which the pincers 102 is closed by squeezing the operating lever 103 and thereby pulling the operating shaft 101b as in the long-reach pincers 100 of FIG. 6, force as in a strung bow is generated. In other words, force in a bending direction is generated in the main shaft 101a.

Thus, in the long-reach operating rod 101 including flexible members having small diameters as described above, the main shaft 101a bows, although only slightly.

In the unidirectional rotation mechanism 105 of the lock structure 104, restoring force caused by bending of the main shaft 101a is transferred to the hand side, and resulted forces are balanced between the ratchet gear 105a and the ratchet pawl 105b, which allows the operating lever 103 to be locked in the gripping state.

However, for example, when an operator handles the long-reach pincers 100 without holding the operating lever 103 in the locked state, the operating lever 103 may be hit by something and thus external force may be instantaneously applied thereto in a closing direction of the operating lever 103.

In this case, when the external force due to impact causing the operating lever 103 to turn in the closing direction exceeds opposite force to pull the point 103a of action toward a tip side (force due to the restoring force of the main shaft 101a), the ratchet pawl 105b is lifted by function of the unidirectional rotation mechanism 105 to move to a tooth in a closing side to which the operating lever 103 is allowed to turn.

However, such a movement is made instantaneously in reality. More specifically, if the engaged ratchet pawl 105b is lifted for a moment to move to an adjacent tooth in the closing side and the ratchet gear 105a returns before landing of the ratchet pawl 105b, an engaged position of the ratchet pawl 105b changes to a loosened position as compared to an original engaged position. Even loosening of a single tooth lowers gripping force by the pincers 102. Thus, it is possible that the gripping state becomes unstable. Moreover, it is also possible that since such an event occurs instantaneously, an operator continues to work without noticing the event, which is dangerous.

FIG. 8 shows an example in which work efficiency is significantly lowered if a locking pawl is configured not to be easily disengaged for prevention of the occurrence of the loosening in the locked state as described above.

FIG. 8 schematically shows relationships between an engagement pawl 112 and a gear 106 in a locked state. The gear 106 is integrally formed with the operating lever 103 as shown in FIG. 6. Instead of the ratchet pawl 105b of FIG. 7, the engagement pawl 112 is employed here for description. While states shown in FIGS. 8(a) to 8(c) are all regarded as the locked state, each has a different engagement depth. In a lock structure shown in FIG. 8, a width of a tooth groove and a width of the engagement pawl 112 in a circumferential direction have substantially the same dimension so that the engagement pawl 112 can not to be lifted out of the gear 106 easily. With such a configuration, as described above, turning force 120 to return the gear 106 to an opening side acts as force for pressing the engagement pawl 112 in the circumferential direction (direction of the opening side), wherein the turning force 120 is generated by the restoring force of the bent main shaft 101a.

Specifically, the engagement pawl 112 is applied with the turning force 120 from an opening direction tooth surface 107a, wherein the opening direction tooth surface 107a is one of tooth surfaces constituting the tooth groove and facing a turning direction of the operating lever 103 to open the pincers 102 (see FIG. 6). Since a tip of the engagement pawl 112 is pushed to the opening side by the rotating force 120, such pressure as to press the engagement pawl 112 against both the opening direction tooth surface 107a and a closing direction tooth surface 107b is generated in the tooth groove formed to have substantially the same dimension as those of the engagement pawl 112. Consequently, reactive force 122 is generated from the closing direction tooth surface 107b to the engagement pawl 112. Thus, large frictional force is generated between the engagement pawl 112 and both the opening direction tooth surface 107a and the closing direction tooth surface 107b.

Transitioning from the locked state in FIG. 8(a) to a state in FIG. 8(b) by pulling the engagement pawl 112 will be discussed next.

In the state shown in FIG. 8(b), the engagement pawl 112 is slightly away from a tooth bottom 107c in the tooth groove. Thus, a contact area between the opening and closing direction tooth surfaces 107a, 107b and the engagement pawl 112 is smaller than that in the state of FIG. 8(a). However, the force to push the engagement pawl 112 toward the direction of the opening side is still generated in the tooth groove. Thus, frictional force also have a large effect on the engagement pawl 112 due to action of the turning force 120 and the reactive force 122.

Even when the engagement pawl 112 is pulled to be in a state in FIG. 8(c), a condition in which the engagement pawl 112 receives the frictional force from both the opening direction tooth surface 107a and the closing direction tooth surface 107b is unchanged.

As described above, when the configuration as shown in FIG. 8 is employed, the locked state can be maintained in an extremely stable manner. However, due to the large frictional force generated in pulling of the engagement pawl 112, it is difficult to release the locked state. Particularly in the state of FIG. 8(a), very firm engagement makes even transitioning to the state of FIG. 8(b) difficult, and the work efficiency is lowered.

In view of the foregoing problems, it is an object of the present invention to provide a lock structure for an operating lever, wherein locking and unlocking can be easily achieved, and even when unwanted external force is applied to the operating lever in a locked state, the locked state can be stably maintained.

Solution to Problem

To achieve the aforementioned object, the present invention provides a lock structure for an operating lever in long-reach pincers for distantly operating pincers provided on a tip side thereof by a main shaft in which the operating lever is pivotally supported at a position in a hand side thereof and an operating shaft attached along the main shaft, wherein one end of the operating shaft is connected to a point of action in the operating lever. The lock structure for the operating lever includes an engaged section configured such that tooth rows are provided in an arc shape around a turning center of the operating lever, and tooth grooves constituting the tooth rows with a tooth bottom provided between a pair of tooth surfaces facing each other in a circumferential direction, and an engagement pawl disposed in a larger diameter side of the arc to be engaged with and disengaged from the tooth groove, and to be contacted on an opening direction tooth surface and a corner part in an intersection of a closing direction tooth surface and the tooth bottom in an engaged state, wherein the opening direction tooth surface is facing a direction of the operating lever to open the pincers and the closing direction tooth surface is facing a direction of the operating lever to close the pincers. An angle between the closing direction tooth surface and the tooth bottom is larger than an angle between the opening direction tooth surface and the tooth bottom.

In the lock structure for the operating lever according to the present invention, in addition to the above configuration, the closing direction tooth surface is inclined at a predetermined angle toward the direction in which the pincers are opened with reference to a normal line to the tooth bottom in such a manner that the closing direction tooth surface is inclined with the corner part as a center as it goes toward a larger diameter side, and a side surface of the engagement pawl to be contacted to the corner part is formed to extend in parallel to the normal line to the tooth bottom.

In the lock structure for the operating lever according to the present invention, in addition to the above configuration, the closing direction tooth surface is inclined at a predetermined angle toward the direction in which the pincers are opened with reference to a normal line to the tooth bottom in such a manner that the closing direction tooth surface is inclined as it goes from the corner part toward a larger diameter side, and a side surface of the engagement pawl to be contacted to the corner part is inclined at the predetermined angle toward the same direction as the direction toward which the closing direction tooth surface is inclined with reference to the normal line to the tooth bottom.

Advantageous Effects of Invention

As described above, according to the present invention, the engagement pawl in a state of being engaged with a gear (tooth groove) is contacted on the opening direction tooth surface and the corner part in the side of the closing direction tooth surface, wherein the opening direction tooth surface is facing the direction of the pincers to be opened and the closing direction tooth surface is facing the direction of the pincers to be closed. Accordingly when force to open the pincers is exerted, pressure is applied to the engagement pawl by the opening direction tooth surface. At this time, a tip of the engagement pawl receives turning force in an opening direction of the pincers (circumferential direction), but reactive force in a closing direction is generated in the contacted corner part, and the force in the both directions are balanced. Thus, even when the force from the gear in the circumferential direction (particularly the turning force in the direction to open the pincers) is applied to the engagement pawl in the engaged state, no force in a diameter expansion direction causing the engagement pawl to be disengaged from the tooth groove is generated to act on the engagement pawl, which makes the locked state stable.

Also according to the present invention, in addition to an above effect, a gap is formed between the closing direction tooth surface of the surfaces constituting the tooth groove and the engagement pawl in the engaged state in such a manner that the more in the larger diameter side, the larger the gap is. Consequently, a slight movement of the engagement pawl in the diameter expanding direction immediately allow the engagement pawl free from the force exerted thereon from the closing side, which makes it easy to release a locked state. Moreover, in a locking operation, since a space in the larger diameter side of the tooth groove is larger than an area of the tooth bottom, an engagement operation can be facilitated and the work efficiency can be therefore improved.

Further according to the present invention, in addition to the above effect, the closing direction tooth surface of the surfaces constituting the tooth groove is inclined toward the opening direction with respect to the normal line to the tooth bottom at the same predetermined angle as an angle at which the side surface of the engagement pawl is inclined. Consequently, the closing direction tooth surface of the tooth groove and the side surface of the engagement pawl in the closing direction side are in surface contact with each other in the engaged state. Thus, even when force from the engaged section to the engagement pawl along the circumferential direction is greatly changed due to an impact on the operating lever, for example, the engagement pawl can distribute the force received from the closing direction tooth surface of the tooth groove over its surface. Thus, engagement is less likely to be released and the locked state can be stably maintained.

DESCRIPTION OF EMBODIMENTS

Figure 1:
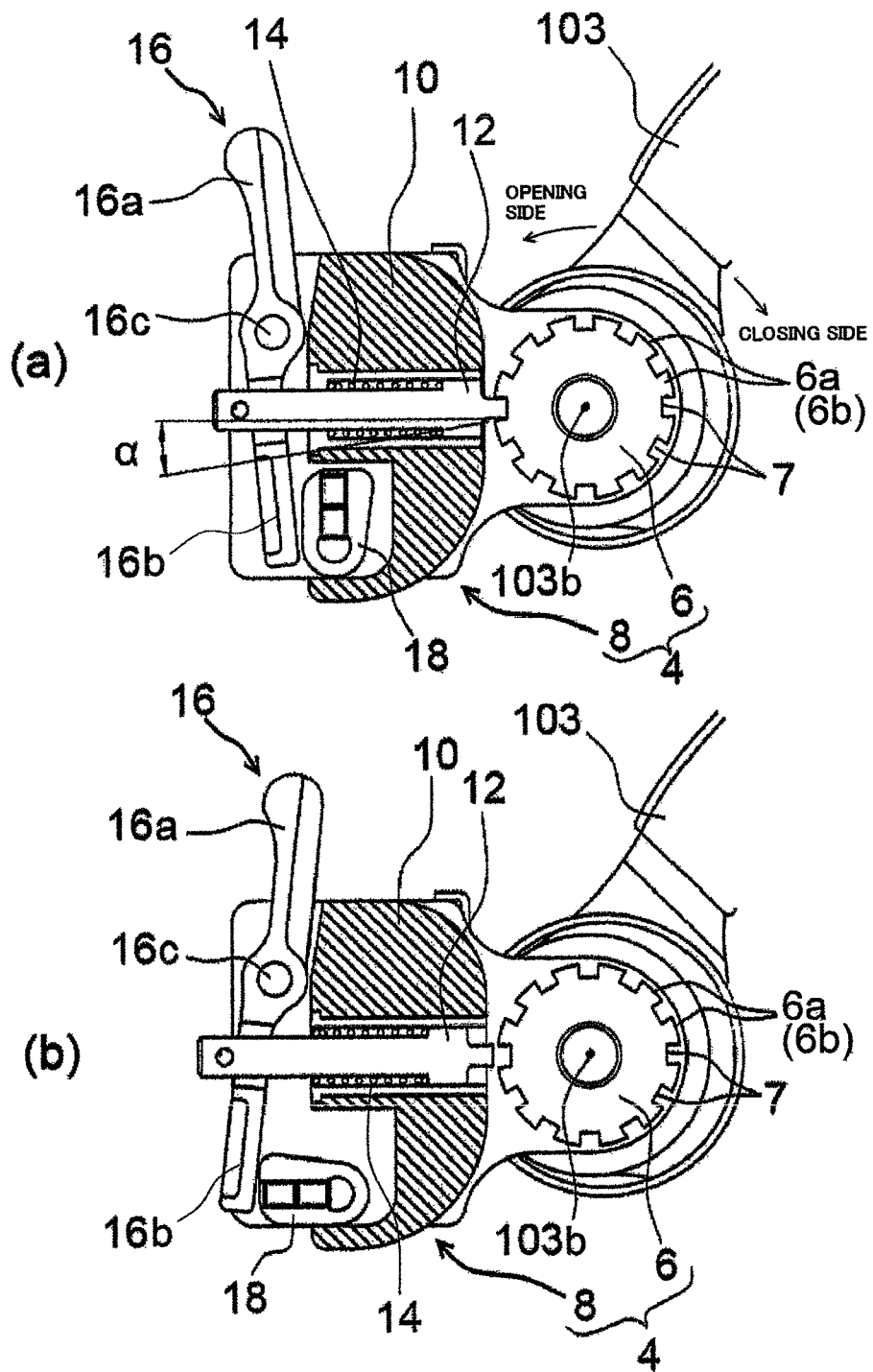
FIG. 1 is an enlarged view of a lock structure for an operating lever in long-reach pincers according to a first embodiment of the present invention wherein (a) shows a locked state, and (b) shows an unlocked state.

A lock structure for an operating lever in long-reach pincers according to an embodiment of the present invention will be described with reference to the drawings. Since the configuration of the long-reach pincers is similar to the long-reach pincers 100 shown in FIG. 6 except the lock structure, corresponding components will be denoted by the same reference numerals and FIG. 6 will be referred to when necessary regarding the overall configuration.

First Embodiment

First, configurations in a lock structure 4 for an operating lever 103 according to a first embodiment of the present invention will be described with reference to FIG. 1. FIG. 1 shows a turning center 103b of the operating lever 103 pivotally supported on the long-reach pincers in a hand side thereof and the lock structure 4 provided in a periphery thereof in an enlarged manner. FIG. 1(a) shows the operating lever 103 in a locked state, and FIG. 1(b) shows the operating lever 103 in an unlocked state.

Figure 6:
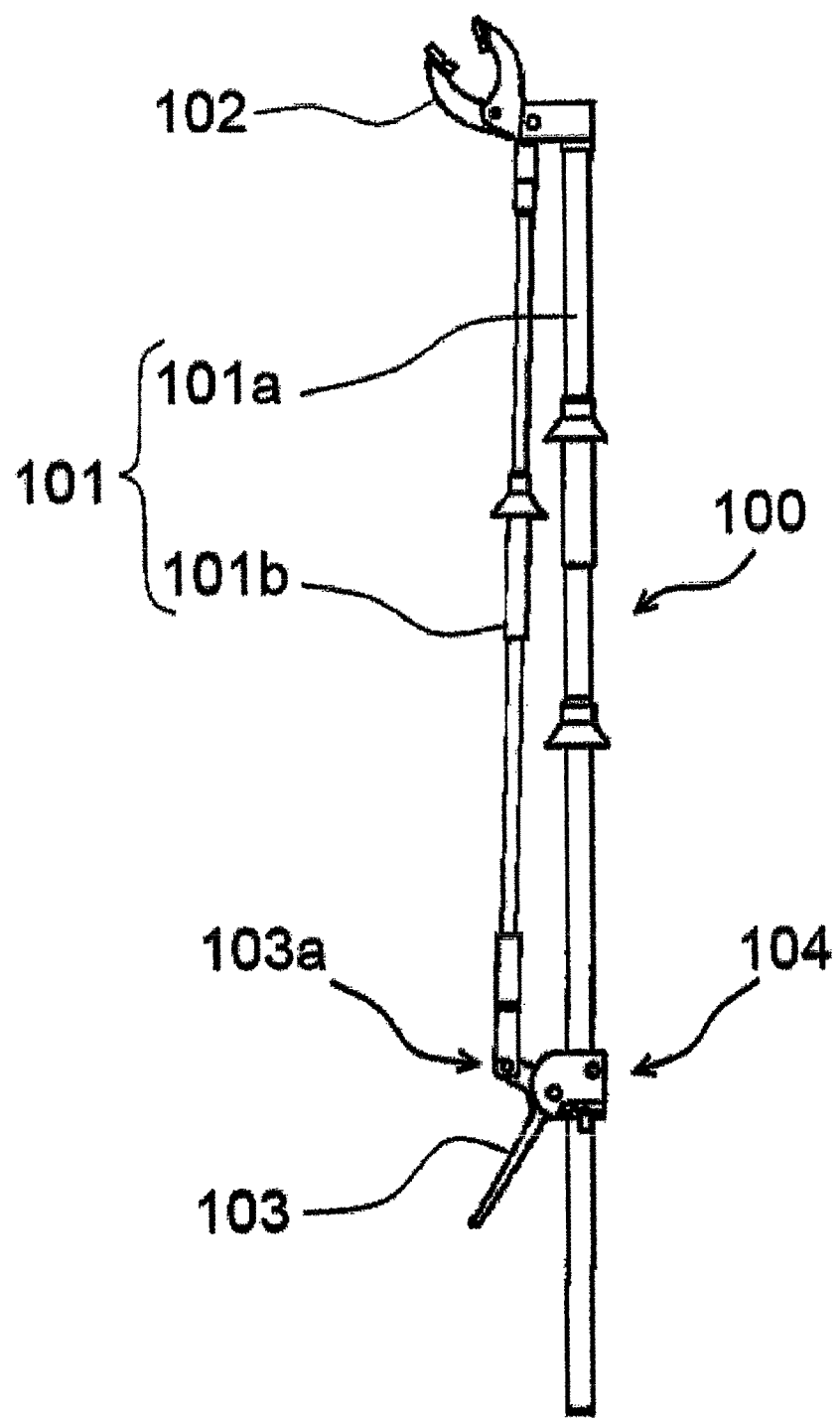
FIG. 6 is an overall view of conventional long-reach pincers.
Figure 7:
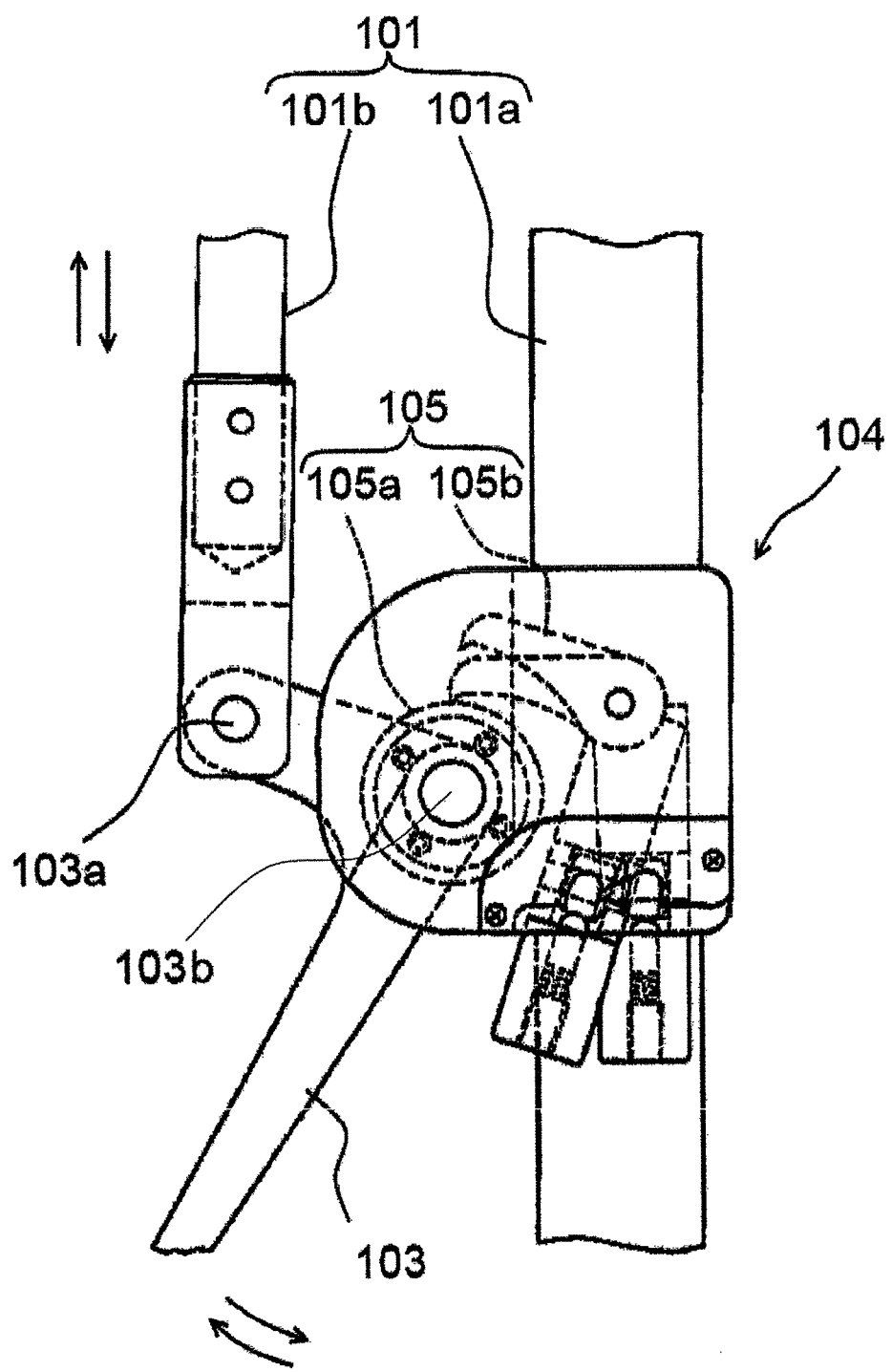
FIG. 7 is an enlarged view showing a surrounding area of an operating lever in the long-reach pincers shown in FIG. 6.
Figure 8:
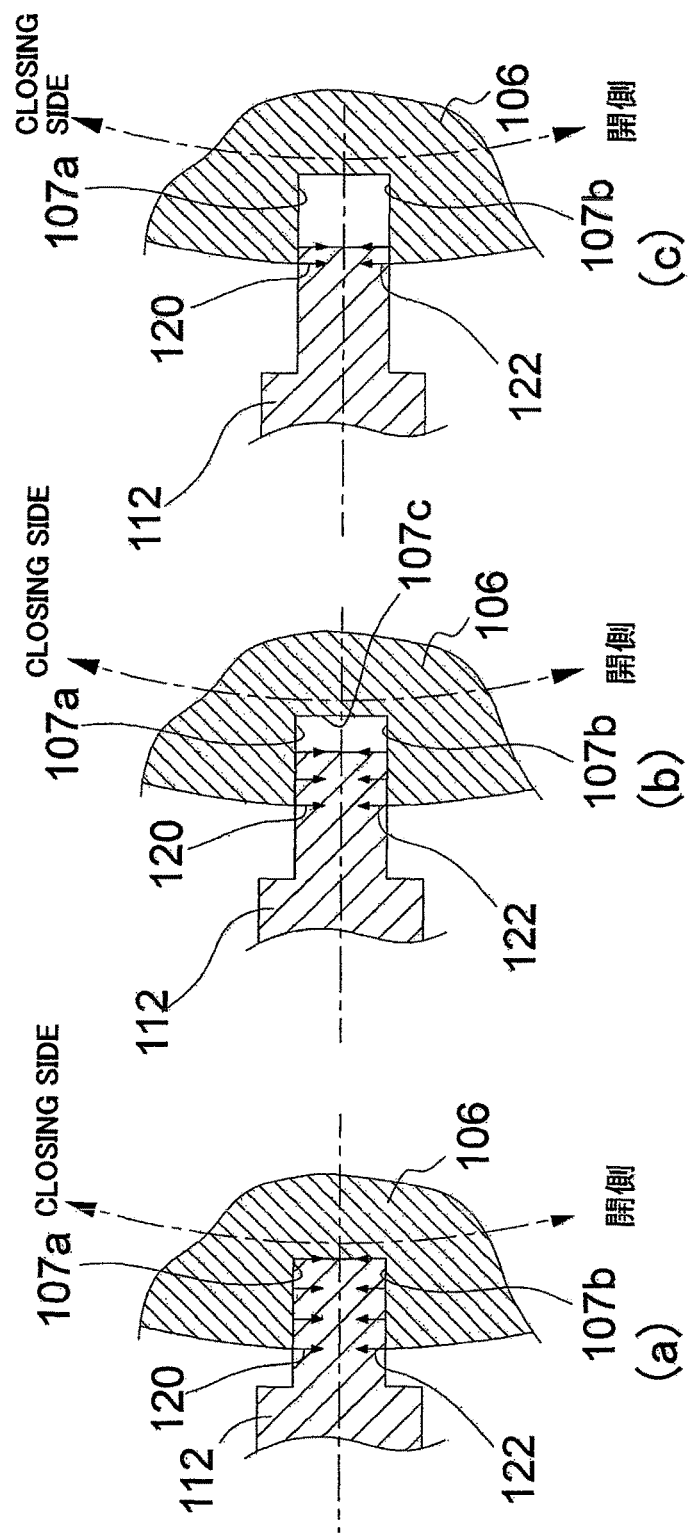
FIG. 8 is a schematic diagram showing functions of a conventional lock structure wherein (a) shows a locked state, (b) shows a state in which an engagement pawl is away from a tooth bottom of a tooth groove, and (c) shows a state in which the engagement pawl is further away from the tooth groove bottom.

Referring once to FIG. 6, the overall configuration will now be described. In the long-reach pincers according to the present embodiment, a long-reach operating rod 101 includes a main shaft 101a and an operating shaft 101b attached along the main shaft 101a. Pincers 102 are attached to the long-reach operating rod 101 in a tip side. One end of the operating shaft 101b in the hand side is connected to a point 103a of action in the operating lever 103. With such a configuration, the pincers 102 can be opened and closed by turning the operating lever 103 through the operating shaft 101b.

Referring back to FIG. 1(a), the operating lever 103 includes a gear 6 (engaged section) disposed concentric with the turning center 103b. In this manner, in each tooth groove 7 in the gear 6 with tooth rows 6a provided in a circular pattern around the turning center 103b of the operating lever 103, a tooth bottom 7c (which will be described later with reference to FIG. 2) is formed between a pair of tooth surfaces facing a circumferential direction. That is, the tooth grooves 7 in the gear 6 according to the present embodiment are formed not in what is called a V-like shape but in a shape similar to a rectangle.

Regarding the pair of tooth surfaces facing to the circumferential direction of the gear 6 in the each tooth groove 7, the tooth surface facing a direction for the operating lever 103 to be turned around the turning center 103b to open the pincers 102 is herein referred to as an opening direction tooth surface 7a. The tooth surface facing a closing direction is herein referred to as a closing direction tooth surface 7b. The shape of the tooth groove 7 will be described later in detail with reference to FIG. 2.

Separately from the above gear 6, an engagement pawl 12 is provided in a larger diameter side of the gear 6 with the tooth rows 6a arranged in a circular pattern in such a manner that the engagement pawl 12 can be engaged with and disengaged from the tooth groove 7. The engagement pawl 12 is provided in an engagement/disengagement switching section 8. For ease of explanation, a body section 10 is illustrated in a partially cross-sectional view such that the internal configuration thereof can be seen.

The engagement pawl 12 is biased toward the gear 6 by a spring 14 provided along an outer periphery thereof. Consequently, the engagement pawl 12 is pushed out by force of the spring 14 to be engaged with one of the tooth grooves 7 in the gear 6. A rear end side (larger diameter side as viewed from the gear 6) of the engagement pawl 12 is connected to a switching lever 16 to form a substantially T-like shape in a relatively pivotable manner.

The switching lever 16 is pivotally supported on the body section 10 of the engagement/disengagement switching section 8 at a substantially center portion thereof with a rotating shaft 16c. Thus turning a tab 16a allows the engagement pawl 12 to move toward or away from the gear 6 by leverage.

A holding section 18 provided in the body section 10 can abut against an end 16b of the switching lever 16 positioned opposite to the tab 16a across the rotating shaft 16c. The holding section 18 is provided to hold the switching lever 16 in an unlocked state in which the engagement pawl 12 is withdrawn from the gear 6 against force of the spring 14.

The holding section 18 is provided to be rotatable within a range of about 90 degrees with respect to the body section 10. In the arrangement of FIG. 1(a), the holding section 18 is not in contact with the switching lever 16 and the engagement pawl 12 is engaged with the gear 6. In the arrangement of FIG. 1(b), on the other hand, an end opposite to the tab 16a in the switching lever 16 is pushed away by the holding section 18 against the biasing force of the spring 14, and the engagement pawl 12 is disengaged from the gear 6. Consequently, the operating lever 103 can be freely turned in the state shown in FIG. 1(b).

Figure 2:
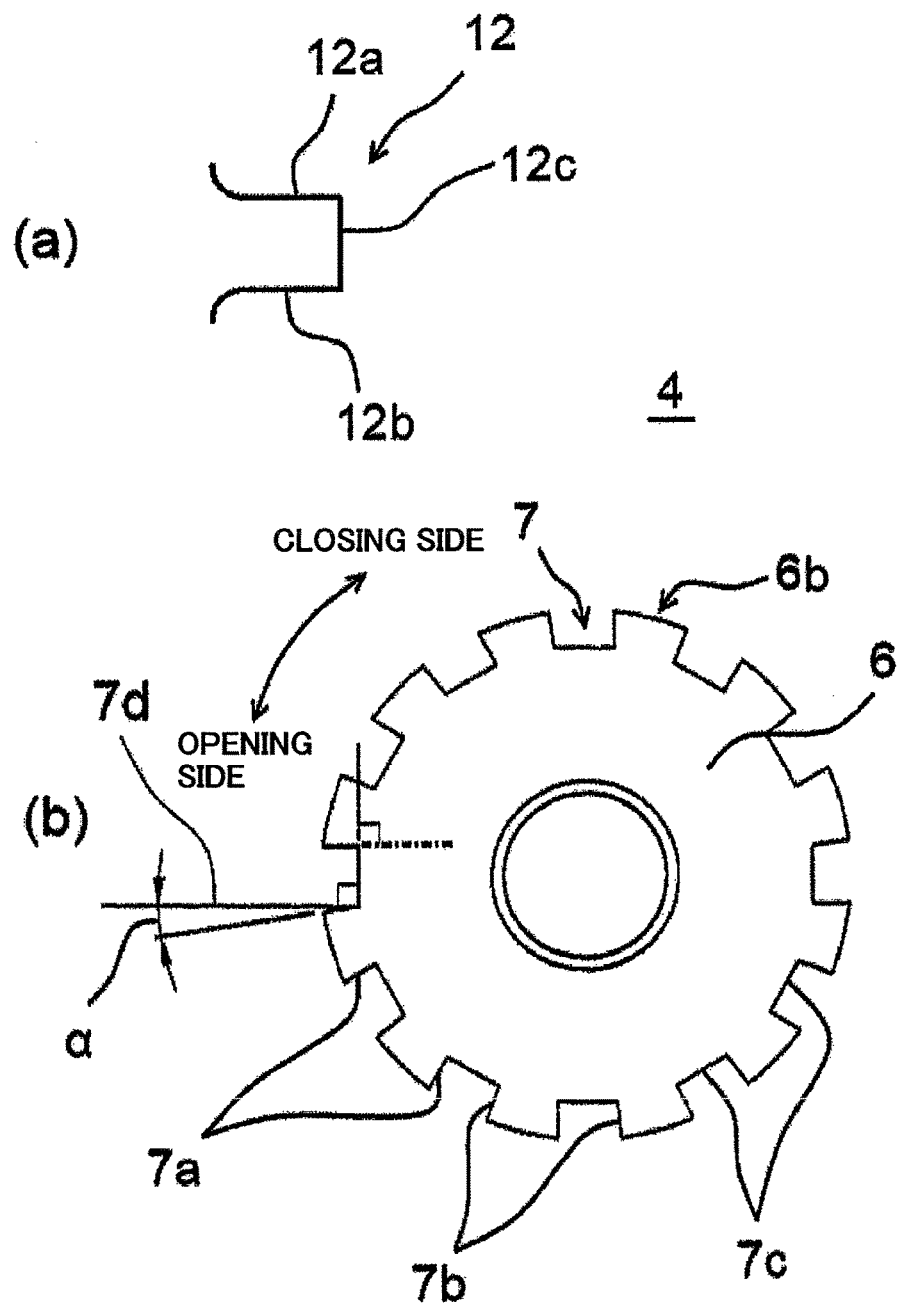
FIG. 2 is an enlarged view of the lock structure shown in FIG. 1 wherein (a) shows an engagement pawl, and (b) shows a gear.

Next, shapes of the engagement pawl 12 and the gear 6 (the lock structure 4) are shown in FIG. 2. FIG. 2(a) is an enlarged view showing a shape of a tip of the engagement pawl 12, and FIG. 2(b) is an overall view of the gear 6.

As shown in FIG. 2(a), the tip of the engagement pawl 12 in the lock structure 4 according to the present embodiment is formed in a rectangular shape. More specifically in a state in which the engagement pawl 12 is engaged with the gear 6, the opening direction tooth surface 7a and the closing direction tooth surface 7b respectively facing both side surfaces 12a and 12b are formed substantially parallel to the side surfaces 12a and 12b respectively. A tip surface 12c is formed at a substantially right angle to the side surfaces 12a and 12b.

In FIG. 2(b), a direction in which the operating lever 103 is turned to close the pincers 102 is shown as a closing side. On the other hand, a direction in which the operating lever 103 is turned to open the pincers 102 is shown as an opening side. As can be seen from FIG. 2(b), in the gear 6 according to the present embodiment, a shape of a tooth 6b is asymmetrically formed in the opening side and the closing side.

Specifically, an angle between the opening direction tooth surface 7a and the tooth bottom 7c, which form the tooth groove 7, is 90 degrees in the lock structure 4 according to the present embodiment. On the other hand, an angle between the closing direction tooth surface 7b and the tooth bottom 7c, is 99 degrees. Accordingly, the tooth groove 7 is opened slightly wider toward the opening side than toward the closing side in the gear 6 according to the present embodiment. In FIG. 2(b), a predetermined angle of the closing direction tooth surface 7b inclined toward the opening side from a normal line 7d to the tooth bottom 7c is shown as an opening angle $\alpha$ ($\alpha$=9°).

Functions of the lock structure 4 will be described next with reference to FIG. 3.

Figure 3:
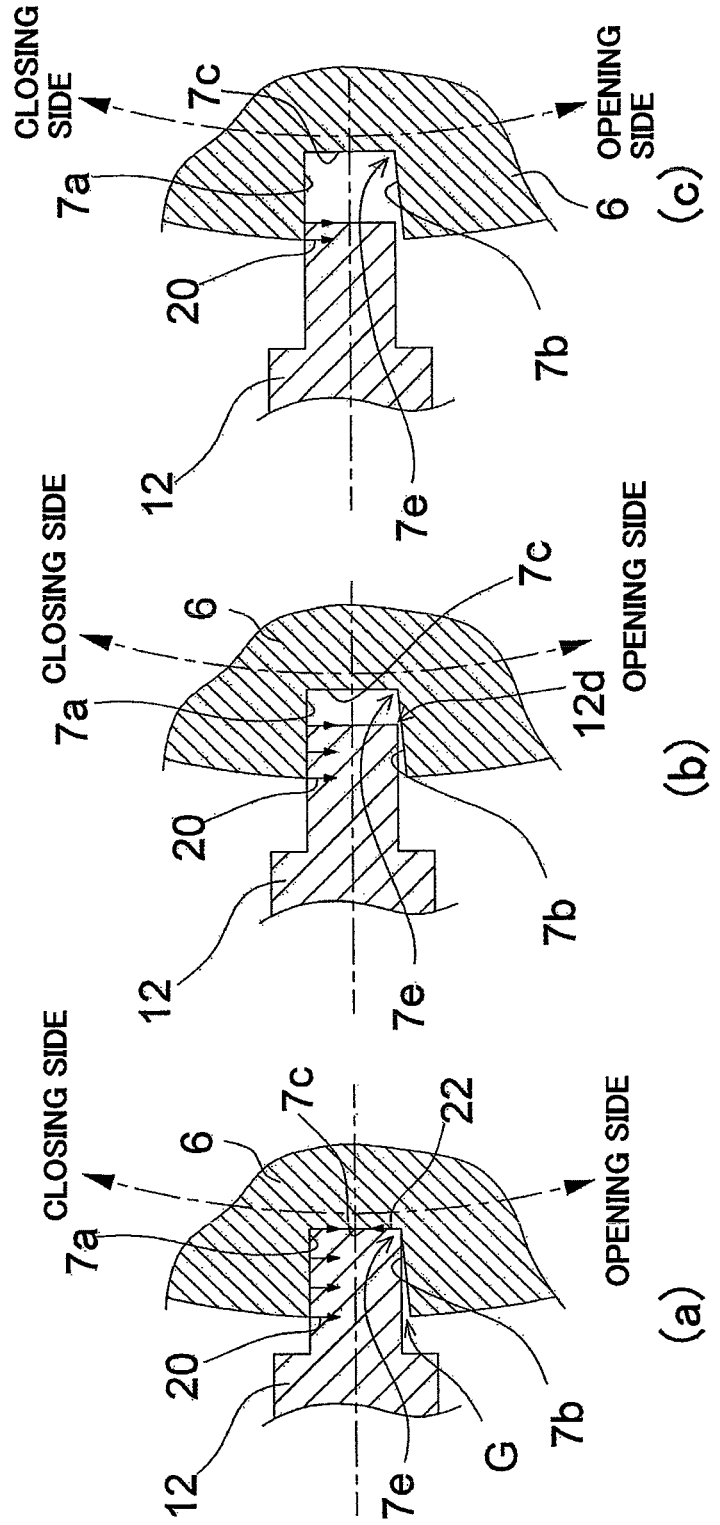
FIG. 3 is a schematic diagram showing functions of the lock structure shown in FIG. 1 wherein (a) shows a locked state, (b) shows a state in which the engagement pawl is away from a tooth bottom of a tooth groove, and (c) shows a state in which the engagement pawl is further away from the tooth bottom.

FIG. 3 schematically shows one of the tooth grooves 7, forming the tooth row 6a of the gear 6, and a tip portion of the engagement pawl 12 in an enlarged manner (see FIG. 1). FIGS. 3(a) to 3(c) all show the locked state but with a different engagement depths one another. FIG. 3(a) shows a state of the engagement pawl 12 being fitted to a position at which the engagement pawl 12 is contacted on the tooth bottom 7c of the tooth groove 7. FIG. 3(b) shows a state of the tip of the engagement pawl 12 being slightly away from the tooth bottom 7c. FIG. 3(c) shows a state in which a distance between the engagement pawl 12 and the tooth bottom 7c is further increased than that in FIG. 3(b). In FIG. 3 the clockwise direction is shown as a turning direction for the operating lever 103 to close the pincers 102.

As shown in FIG. 3(a), in the locked state of the operating lever 103, the tip portion of the engagement pawl 12 is in contact with the opening direction tooth surface 7a and the tooth bottom 7c in the tooth groove 7. The engagement pawl is formed in such a manner that a gap G between the tip portion of the engagement pawl 12 and the closing direction tooth surface 7b is increased as it goes toward the larger diameter side. In other words, the engagement pawl 12 is only contacted on a corner part 7e between the closing direction tooth surface 7b and the tooth bottom 7c in the closing side. Thus, in the locked state, as restoring force due to bending of the main shaft 101a acts as force to rotate the gear 6 toward the opening side, the opening direction tooth surface 7a presses a side of the engagement pawl 12.

Since the tip of the engagement pawl 12 is contacted on the corner part 7e of the closing direction tooth surface 7b, reactive force 22 from the corner part 7e indicated by an arrow is exerted on the engagement pawl 12. Also, turning force 20 from the opening direction tooth surface 7a indicated by an opposite arrow is exerted on the engagement pawl 12. Thus, the engagement pawl 12 is applied with forces from the both sides thereof in the circumferential direction of the gear 6 in the locked state which makes the locked state stable.

Reference is made to FIG. 3(b). When, the switching lever 16 in FIG. 1 is operated to apply force to disengage the engagement pawl 12 from the tooth groove in the locked state in FIG. 3(a), the engagement pawl 12 and the tooth bottom 7c are away from each other as shown in FIG. 3(b). At this time, the tip of the engagement pawl 12 is away from the corner part 7e of the closing direction tooth surface 7b as can be seen in FIG. 3(b). Thus, the circumferential force exerted on the engagement pawl 12 is only the turning force 20 received from the opening direction tooth surface 7a.

Accordingly, in the lock structure 4 according to the present embodiment, when the engagement pawl 12 in contact with the tooth bottom 7C is engaged with the gear 6, the side surfaces 12a and 12b of the engagement pawl 12 are pressed by the forces from the respective tooth surfaces (the opening direction tooth surface 7a and the closing direction tooth surfaces 7b) facing the tooth groove 7, which makes the locked state stable. On the other hand, when the engagement pawl 12 (larger diameter direction of the gear 6) is applied with the force in a retracting direction thereof, the reactive forces 22 received from the closing direction tooth surface 7b and the corner part 7e disappears immediately, and only the turning force 20 from the opening direction tooth surface 7a remains. Consequently, as resistance to pulling out the engagement pawl 12 is reduced, the locked state can be easily released. In other words, as one of the forces, i.e., the reactive force 22 disappears, firm engagement is released, which makes unlocking easy.

Reference is made to FIG. 3(c). In FIG. 3(c), a distance between the engagement pawl 12 and the tooth bottom 7c is further increased. However the turning force 20 applied from the opening direction tooth surface 7a to the engagement pawl 12 in the circumferential direction is nearly unchanged from the state in FIG. 3(b). Thus, the engagement pawl 12 can be stably pulled out of the tooth groove 7 by operating the switching lever 16, which makes the operation easy even for a non-expert.

Illustrations in FIG. 3 do not take account of any backlash of the engagement pawl 12 in the engagement/disengagement switching section 8. If the backlash of the engagement pawl 12 exists in the engagement/disengagement switching section 8, a tip side of the engagement pawl 12 is slightly leaned to the opening side upon receiving the turning force 20 from the opening direction tooth surface 7a. In this case, even in a state of the engagement pawl 12 being not contacted to the tooth bottom 7c, the tip side of the engagement pawl 12 is inclined toward the opening side and can be brought into sliding contact with the closing direction tooth surface 7b. However, the closing direction tooth surface 7b is formed so as to be inclined at a predetermined angle more to the opening side as it goes toward the larger diameter side as described above. That is, the turning force 20 of the opening direction tooth surface 7a pressing the engagement pawl 12 can be easily released to the opening side. Thus, in the lock structure 4 according to the present embodiment, even when the engagement pawl 12 in the engagement/disengagement switching section 8 has some backlash, a performance of the firm engagement can effectively lowered.

Second Embodiment

A lock structure 54 for an operating lever 103 according to a second embodiment of the present invention will be described next with reference to FIGS. 4 and 5. Components similar to those shown in the first embodiment will be denoted by the same reference numerals. Regarding the overall configuration of long-reach pincers, FIG. 6 will be referred to when necessary as with the first embodiment.

Figure 4:
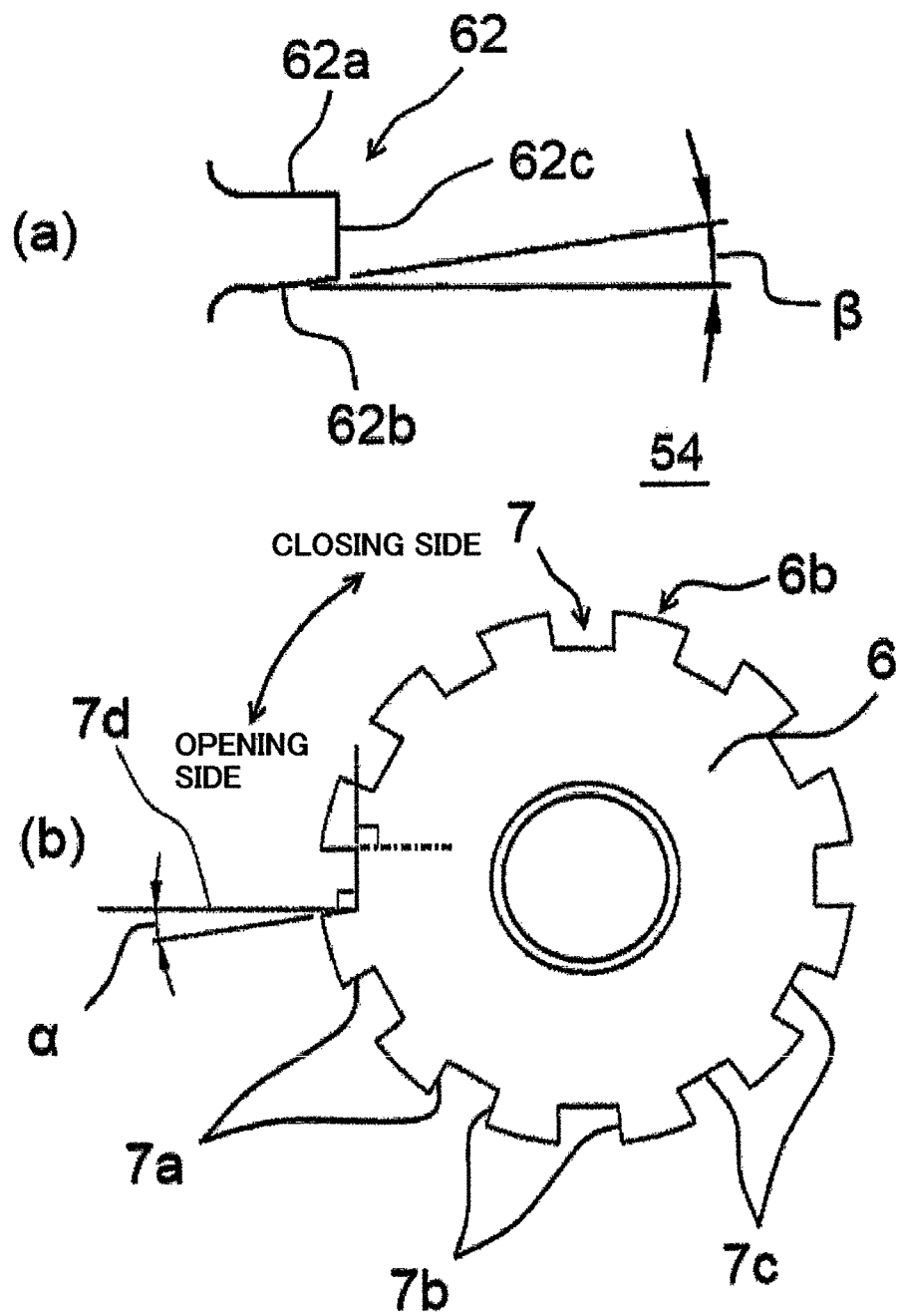
FIG. 4 is an enlarged view of a lock structure in long-reach pincers according to a second embodiment of the present invention, wherein (a) shows an engagement pawl, and (b) shows a gear.

Referring to FIG. 4, FIG. 4(a) is an enlarged view showing a shape of a tip of an engagement pawl 62, and FIG. 4(b) is an overall view of a gear 6. Unlike the first embodiment, the tip of the engagement pawl 62 in the lock structure 54 according to the present embodiment has no rectangular shape as shown in FIG. 4(a). The shape of the gear 6, on the other hand, is the same as that in the first embodiment as shown in FIG. 4(b).

In an engaged state, the engagement pawl 62 according to the present embodiment is formed to have a substantially right angle between a side surface 62a facing an opening direction tooth surface 7a of a tooth groove 7 and a tip surface 62c, while having an angle slightly larger than the right angle between a side surface 62b facing a closing direction tooth surface 7b of the tooth groove 7, and the tip surface 62c. The slightly larger angle is shown in the figure as an inclination angle $\beta$ (predetermined angle).

Specifically, the lock structure 54 according to the present embodiment is configured such that $\beta=\alpha$. Consequently, in a state in which the engagement pawl 62 is fitted into the tooth groove 7, the side surface 62a is contacted on the opening direction tooth surface 7a, the tip surface 62c is contacted on a tooth bottom 7c, and the side surface 62b is contacted not only on a corner part 7e but also the closing direction tooth surface 7b.

Functions of the lock structure 54 according to the present embodiment will be described next with reference to FIG. 5.

Figure 5:
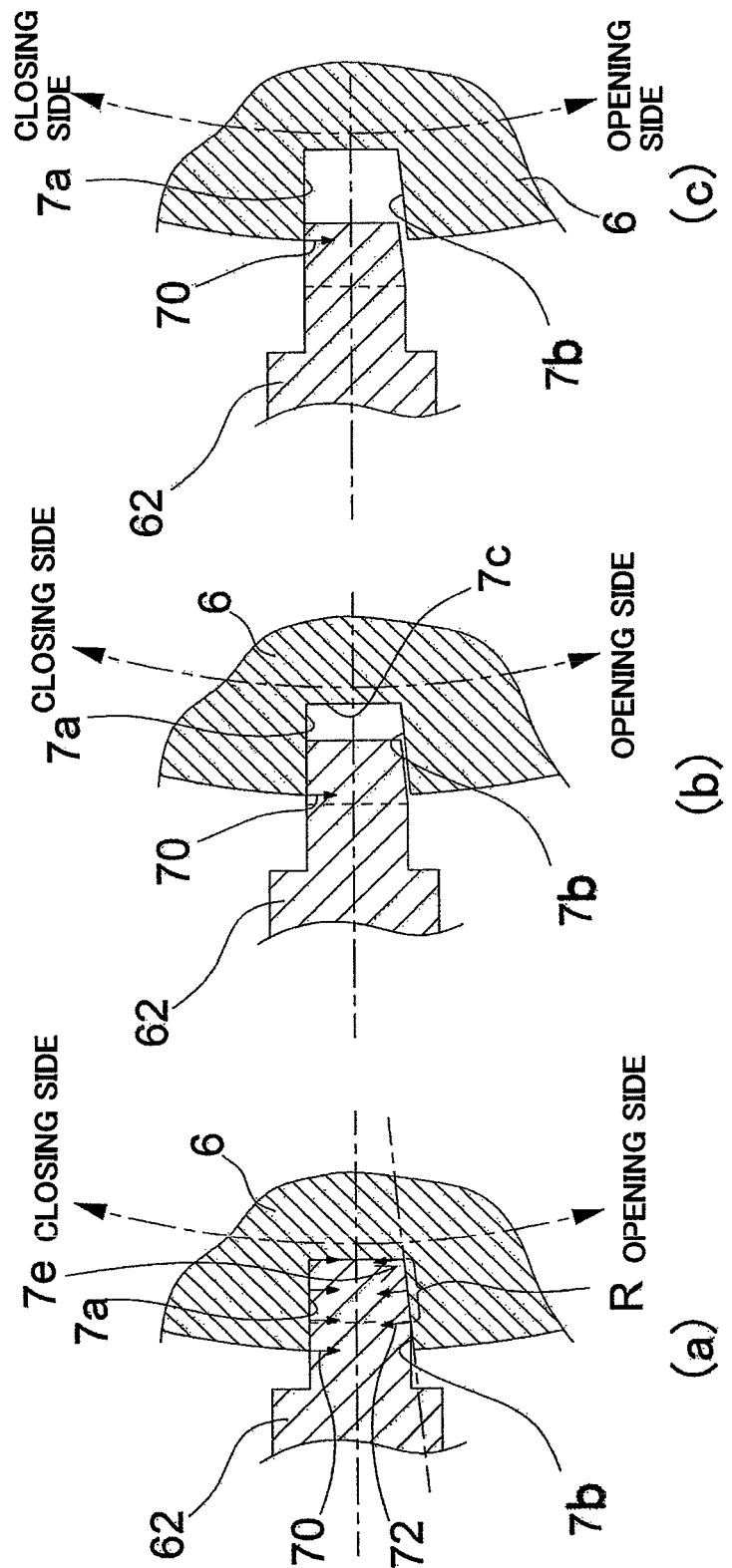
FIG. 5 is a schematic diagram showing functions of the lock structure shown in FIG. 4, wherein (a) shows a locked state, (b) shows a state in which the engagement pawl is away from a tooth bottom of a tooth groove, and (c) shows a state in which the engagement pawl is further away from the tooth bottom.

FIG. 5 schematically shows one of tooth grooves 7 forming a tooth row 6a of the gear 6, and only a tip portion of the engagement pawl 62 in an enlarged manner (see FIG. 1). FIGS. 5(a) to 5(c) all show a locked state but with a different engagement depth. FIG. 5(a) shows a state of the engagement pawl 62 being fitted to a position at which the engagement pawl 62 is contacted on the tooth bottom 7c of the tooth groove 7. FIG. 5(b) shows a state of the tip of the engagement pawl 62 slightly away from the tooth bottom 7c. FIG. 5(c) shows a state in which a distance between the engagement pawl 62 and the tooth bottom 7c is further increased than that in FIG. 5(b). In FIG. 5 the clockwise direction is shown as a turning direction for the operating lever 103 to close pincers 102.

As shown in FIG. 5(a), in the locked state of the operating lever 103, the side surface 62a and the tip surface 62c in the tip portion of the engagement pawl 62 are respectively in contact with the opening direction tooth surface 7a and the tooth bottom 7c in the tooth groove 7. Moreover, as described above, in the lock structure 54 according to the present embodiment, the closing direction tooth surface 7b and the engagement pawl 62 are formed in such a manner that an opening angle $\alpha$ of the closing direction tooth surface 7b (see FIG. 4(b)) equals the inclination angle $\beta$ of the engagement pawl 62. Thus, the closing direction tooth surface 7b is contacted on the side surface 62b of the engagement pawl 62, which is inclined toward the opening side by the inclination angle $\beta$, within a range of a region R. In this respect, the configuration of the present embodiment is different from the configuration of the first embodiment in which the gap exists between the engagement pawl 62 and the closing direction tooth surface 7b.

As described in the first embodiment, the restoring force of the main shaft 101a bowed by gripping an object to be gripped acts as force for the opening direction tooth surface 7a of the gear 6 to press the engagement pawl 12 toward the opening side. Such force is shown as turning force 70 in FIG. 5.

The engagement pawl 62 is applied with the turning force 70 which is exerted on the engagement pawl 62 as a force to inclination a tip side thereof toward the opening side with a rear end side as a center. Consequently, the side surface 62b of the engagement pawl 62 is pressed against the closing direction tooth surface 7b of the engaged tooth groove 7. Thus, reactive force 72 is generated from the closing direction tooth surface 7b to the side surface 62b of the engagement pawl 62 in the region R.

In other words, when the engagement pawl 62 is applied with the force along the circumferential direction of the gear 6, the turning force 70 and the reactive force 72 are respectively exerted on the side surfaces 62a and 62b of the engagement pawl 62 respectively from the opening direction tooth surface 7a and the closing direction tooth surface 7b of the tooth groove 7, and frictional force is generated on the contact surfaces. Thus, the locked state can be stably maintained without disengagement of the engagement pawl 62 from the tooth groove 7. Accordingly, in a state in which the pincers 102 is locked in a state of gripping an object to be gripped by the lock structure 54 of the operating lever 103, even when the operating lever 103 receives impact due to interference with surrounding equipment during handling of the long-reach pincers, the locked state is maintained and operational safety is ensured as engagement is less likely to be released with respect to the force applied in the circumferential direction.

Reference is made to FIG. 5(b). When operating the switching lever 16 shown in FIG. 1 (see FIG. 1) to apply force so that the engagement pawl 62 is disengaged from the tooth groove 7 in the locked state in FIG. 5(a), the engagement pawl 62 and the tooth bottom 7c are separated away from each other. In this case, as can be seen from FIG. 5(b), the tip of the engagement pawl 62 is separated away from the region R on the closing direction tooth surface 7b. Therefore, the force exerted on the engagement pawl 62 is only the turning force 70 received from the opening direction tooth surface 7a.

More specifically, in the lock structure 54 according to the present embodiment, as with the description of the lock structure 4 made with reference to FIG. 3(b) in the first embodiment, when the engagement pawl 62 is applied with force in a direction of forward and backward movement thereof during a pull-out operation or the like, the force received from the closing direction tooth surface 7b disappears immediately and only the turning force 70 from the opening direction tooth surface 7a remains. Consequently, as resistance to pulling out of the engagement pawl 62 is reduced, the locked state can be easily released. In other words, one of the forces, i.e., the reactive force 72 disappears early, and firm engagement is released, which makes unlocking easy.

Reference is made to FIG. 5(c). In FIG. 5(c), a distance between the engagement pawl 62 and the tooth bottom 7c is further increased. However the turning force 70 applied from the opening direction tooth surface 7a to the engagement pawl 62 in the circumferential direction is nearly unchanged from the state in FIG. 5(b). Thus, the engagement pawl 62 is pulled out of the tooth groove 7 by operating the switching lever 16, which makes the operation easy even for a non-expert.

As with FIG. 3, FIG. 5 also does not take account of any backlash of the engagement pawl 62 in an engagement/disengagement switching section 8. However, in the lock structure 54 according to the present embodiment, as with the first embodiment, the closing direction tooth surface 7b of the gear 6 is inclined toward the opening side at a predetermined angle. Thus, the turning force 70 applied by the opening direction tooth surface 7a can be easily released to the opening side. Consequently, even when the engagement pawl 62 in the engagement/disengagement switching section 8 has some backlash, a performance of the firm engagement can be effectively lowered.

Note that each of the above embodiments shows the configuration in which the angle between the opening direction tooth surface 7a facing the direction to open the operating lever 103, and the tooth bottom 7c is 90 degrees and the angle between the closing direction tooth surface 7b facing the direction to close the operating lever 103, and the tooth bottom 7c is 99 degrees as an example. The present invention, however, is not limited thereto. Other angles may be employed as long as an angle between the closing direction tooth surface 7b and the tooth bottom 7c is set to be larger than an angle between the opening direction tooth surface 7a and the tooth bottom 7c.

Also note that each of the above embodiments shows the configuration with the tooth rows 6a being circularly provided around the turning center 103b of the operating lever 103 (see FIG. 6), that is, the configuration with a so-called gear 6 being disposed as an example. However, the tooth rows 6a may be provided in an arc shape only in a turning range over which loking is required.

INDUSTRIAL APPLICABILITY

The lock structure for the operating lever according to the present invention can stably maintain the locked state even when impact is applied to the operating lever in the turning direction thereof. In addition, since the firm engagement between the engagement pawl and the gear constituting the lock structure is less likely to occur, the lock structure for the operating lever according to the present invention is useful in a field of long-reach gripping tools including plier type gripping tools attached to the tips thereof.

REFERENCE SIGNS LIST

4, 54 lock structure
6 gear (engaged section)
6a tooth row
6b tooth
7 tooth groove
7a opening direction tooth surface
7b closing direction tooth surface
7c tooth bottom
7d normal line (to tooth bottom)
7e corner part
8 engagement/disengagement switching section
10 body section
12, 62 engagement pawl
12a, 12b, 62a, 62b side surface
12c, 62c tip surface
12d opening-side corner section
14 spring
16 switching lever
16a tab
16b end
16c rotating shaft
18 holding section
20, 70 turning force
22, 72 reactive force
100 long-reach pincers
101 long-reach operating rod
101a main shaft
101b operating shaft
102 pincers
103 operating lever
103a point of action
103b turning center
104 lock structure
105 unidirectional rotation mechanism
105a ratchet gear
105b ratchet pawl
106 gear
107a opening direction tooth surface
107b closing direction tooth surface
107c tooth bottom
112 engagement pawl
120 turning force
122 reactive force
G gap
R region
• opening angle
• inclination angle

The invention claimed is:
1. A lock structure for an operating lever in long-reach pincers for distantly operating pincers provided on a tip side thereof by a main shaft in which the operating lever is pivotally supported at a position in a hand side thereof and an operating shaft attached along the main shaft, wherein one end of the operating shaft is connected to a point of action in the operating lever, the lock structure for the operating lever comprising:
an engaged section configured such that tooth rows are provided in an arc shape around a turning center of the operating lever and tooth grooves constituting the tooth rows with a tooth bottom provided between a pair of tooth surfaces facing each other in a circumferential direction; and
an engagement pawl disposed in a larger diameter side of the arc to be engaged with and disengaged from the tooth groove, and to be contacted on an opening direction tooth surface defined by a first one of the pair of tooth surfaces that face each other and a corner part in an intersection of a closing direction tooth surface defined by a second one of the pair of tooth surfaces that face each other and the tooth bottom in an engaged state, wherein the opening direction tooth surface is facing a direction of the operating lever to open the pincers and the closing direction tooth surface is facing a direction of the operating lever to close the pincers; and an angle between the closing direction tooth surface and the tooth bottom is larger than an angle between the opening direction tooth surface and the tooth bottom.

2. The lock structure for an operating lever according to claim 1, wherein:

the closing direction tooth surface is inclined at a predetermined angle toward the direction in which the pincers are opened with reference to a normal line to the tooth bottom in such a manner that the closing direction tooth surface is inclined with the corner part as a center as it goes toward a larger diameter side; and a side surface of the engagement pawl to be contacted to the corner part is formed to extend in parallel to the normal line to the tooth bottom.

3. The lock structure for an operating lever according to claim 1, wherein:

the closing direction tooth surface is inclined at a predetermined angle toward the direction in which the pincers are opened with reference to a normal line to the tooth bottom in such a manner that the closing direction tooth surface is inclined as it goes from the corner part toward a larger diameter side, and a side surface of the engagement pawl to be connected to the corner part is inclined at the predetermined angle toward the same direction as the direction toward which the closing direction tooth surface is inclined with reference to the normal line to the tooth bottom.

* * * * *